United States Patent
Schirmeier

(10) Patent No.: US 9,472,912 B2
(45) Date of Patent: Oct. 18, 2016

(54) CONNECTING ELEMENT FOR A CONTACT LINE, CONTACT LINE, AND METHOD FOR PRODUCING A CONTACT LINE

(71) Applicant: CONDUCTIX-WAMPFLER GMBH, Weil am Rhein (DE)

(72) Inventor: Frank Schirmeier, Schopfheim (DE)

(73) Assignee: CONDUCTIX-WAMPFLER GMBH, Weil Am Rhein (DE)

( * ) Notice: Subject to any disclaimer, the term of this patent is extended or adjusted under 35 U.S.C. 154(b) by 0 days.

(21) Appl. No.: 14/761,051

(22) PCT Filed: Jan. 16, 2014

(86) PCT No.: PCT/EP2014/050753
§ 371 (c)(1),
(2) Date: Jul. 15, 2015

(87) PCT Pub. No.: WO2014/111441
PCT Pub. Date: Jul. 24, 2014

(65) Prior Publication Data
US 2015/0357773 A1    Dec. 10, 2015

(30) Foreign Application Priority Data
Jan. 16, 2013    (DE) .......................... 10 2013 100 435

(51) Int. Cl.
*H01R 25/00* (2006.01)
*H01R 25/16* (2006.01)
(Continued)

(52) U.S. Cl.
CPC .............. *H01R 25/162* (2013.01); *H01R 4/18* (2013.01); *H01R 43/048* (2013.01); *H01R 43/20* (2013.01); *Y10T 29/4922* (2015.01)

(58) Field of Classification Search
CPC ...... H01R 25/14; H01R 31/06; H01R 4/185; H01R 4/183; H02G 5/007
USPC ................. 439/111, 115, 213, 638, 877, 880
See application file for complete search history.

(56) References Cited

U.S. PATENT DOCUMENTS

| 2,882,356 A | 4/1959 | Davis et al. |
| 3,541,224 A | 11/1970 | Joly |

(Continued)

FOREIGN PATENT DOCUMENTS

| DE | 29509987 U1 | 8/1995 |
| DE | 19641090 A1 | 4/1997 |

(Continued)

OTHER PUBLICATIONS

International Search Report for PCT/EP2014/050753 dated Mar. 7, 2014.
(Continued)

*Primary Examiner* — Thanh Tam Le
(74) *Attorney, Agent, or Firm* — Paul D. Bianco; Fleit Gibbons Gutman Bongini & Bianco PL

(57) ABSTRACT

A contact line, a connecting element for connecting two busbars of the contact line, and a method for connecting the two busbars. The connecting element can be produced easily and inexpensively and can be easily assembled in situ and allows a quick and simple connection of conductor strands of a contact line. The connecting element has a main part with connecting depressions on at least one longitudinal face of the main part for crimping to at least one lateral wall of the busbars; a contact line has such a connecting element; and a method includes the following steps: plugging the connecting element into respective elongated cavities of the two busbars; aligning pressing bars of a crimping tool relative to corresponding connecting depressions of the connecting element; and inserting lateral walls of the busbars into the connecting depressions and plastically deforming the walls using the pressing bars.

27 Claims, 3 Drawing Sheets

(51) Int. Cl.
    *H01R 4/18*    (2006.01)
    *H01R 43/048*    (2006.01)
    *H01R 43/20*    (2006.01)

(56) References Cited

U.S. PATENT DOCUMENTS

| | | | | |
|---|---|---|---|---|
| 3,976,385 A | * | 8/1976 | Klopfer | B21F 15/06 174/84 C |
| 4,053,194 A | * | 10/1977 | Gilman | H01R 25/145 439/115 |
| 4,673,229 A | | 6/1987 | Jorgensen et al. | |
| 5,645,437 A | * | 7/1997 | Meir | H01R 25/14 439/110 |
| 6,093,037 A | * | 7/2000 | Lin | H01R 25/162 439/115 |
| 6,358,070 B1 | * | 3/2002 | Lin | H01R 25/145 439/115 |
| 7,387,537 B1 | * | 6/2008 | Daily | H01R 13/6272 439/281 |
| 7,442,098 B2 | * | 10/2008 | Uchida | H01R 13/055 439/877 |
| 7,758,358 B1 | * | 7/2010 | Mier-Langner | H01R 25/142 362/219 |
| 7,819,676 B1 | * | 10/2010 | Cardoso | H01R 13/245 439/115 |
| 7,862,383 B2 | * | 1/2011 | Cours | H01R 13/6641 439/638 |
| 8,403,686 B2 | * | 3/2013 | Pizzi | H01R 9/265 439/111 |
| 8,764,490 B2 | * | 7/2014 | Watanabe | F21V 23/06 362/217.13 |
| 8,851,941 B2 | * | 10/2014 | Onuma | H01R 43/16 439/877 |

FOREIGN PATENT DOCUMENTS

| | | |
|---|---|---|
| DE | 19755513 A1 | 6/1999 |
| EP | 0910137 A1 | 4/1999 |
| FR | 2889773 A1 | 2/2007 |
| WO | 8601944 A1 | 3/1986 |

OTHER PUBLICATIONS

Result of examination report for German Application No. 10 2013 100 435.0, filed Jan. 6, 2013.
English translation of Written Opinion dated Jul. 16, 2015 for PCT/EP2014/050753 filed Jan. 16, 2014.
English Translation of International Preliminary Report dated Jul. 21, 2015 for PCT/EP2014/050753 filed Jan. 16, 2014.

* cited by examiner

CONNECTING ELEMENT FOR A CONTACT LINE, CONTACT LINE, AND METHOD FOR PRODUCING A CONTACT LINE

FIELD OF THE INVENTION

The invention concerns a connecting element for the connection of conductor strands of a contact line, an assembly kit for a contact line, a contact line, and a method for producing a contact line.

BACKGROUND OF THE INVENTION

From DE 197 55 513 C2, an expansion connector for successive busbars of a contact line is known. The expansion connector can be plugged into longitudinal cavities of adjacent busbars and automatically produces the electrical connection between the busbars. For this purpose, it has a plastic holder which has a cross bar at the height of the longitudinal cavities of the two busbars, from which two metal bars go out, on both sides and in the longitudinal direction of the busbars; in a direction vertical to the longitudinal direction and the cross bar, these metal bars are acted on elastically so they are kept apart. The metal bars mesh into the longitudinal cavities and are pressed elastically against the inside surface of the metal profile of the busbars. There, the elastic action of the metal bars should ensure that an electrical connection is guaranteed to be secure in all conceivable relative positions of the busbars and the plastic holder. The design of the expansion connector, however, is complex, since, there, the coil springs, which force apart the metal bars, must be inserted into the boreholes of the cross bar.

If the spring force slackens over the course of time, there is also the risk of an undesired loosening of the connected busbars. Furthermore, for the secure fastening of the plastic holder on the busbars, molded pins must be provided on the plastic holder; they mesh into corresponding boreholes of the expansion connector. This is disadvantageous since the plastic pins can break off. In addition, during the installation, an exact centering of the pins on the boreholes must be carried out. These structures increase the construction cost for the production of the expansion connector and complicate the installation of the expansion connector in situ.

FR 2 889 773 A1 discloses a connecting element of a contact line with two claws, which embrace the lateral walls of the contact line busbars and press them against a stop element, so as to make possible both a mechanical and also an electrically secure connection. For the fixing, the claws are screwed with one another in an expensive and time-consuming process. In addition, holes into the lateral walls of the contact lines and corresponding pins on the connecting element are provided there, so as to prevent a displacement of the connecting element in the longitudinal direction. Since the claws are fixed via screw connections which can be loosened, in turn, a permanent deformation of the bent lateral flanks there is not desired and is prevented by, among other things, a stop element that is situated between the lateral flanks.

DE 295 09 987 U1 discloses an assembly kit of plug connectors for connecting at least two single- or multiphase busbars in the low-voltage range for the installation of lights in the low-voltage range. The plug connector is solidly constructed, so that it completely closes the cavities into the busbars which are to be connected. Thus, it cannot be inserted in contact lines, since in their cavities, the sliding contacts must be able to engage freely and slide through.

DE 196 41 090 C2 discloses a connector for busbars, wherein the connector is an elbow that consists of a hinge in at least two parts that are connected with one another by a hinged axle in such a way that they can rotate. Coupling parts are placed on the elbow parts; they are plugged into cavities on the ends of the busbars that are to be connected with one another. The elbow does not have a continuous cavity, so that the connector cannot be used with contact lines, since the sliding contacts cannot slide freely through the cavities of the busbars.

SUMMARY OF THE INVENTION

Therefore, one embodiment disclosed is a connecting element for the connection of two conductor strands of a contact line that is made simply and inexpensively, can be easily assembled in situ, and makes possible a quick and simple connection of the conductor strands of a contact line.

Also disclosed are other embodiments of a connecting element, an assembly kit for a contact line, a contact line, and a method for connecting two busbars of a contact line. Advantageous developments and appropriate refinements of the invention are also disclosed.

A connecting element mentioned in the beginning is characterized in accordance with the invention in that on at least one of its longitudinal sides, the main part has connecting depressions for crimping to at least one lateral wall of the busbars.

Preferably, on both longitudinal sides of the main part, opposite one another, connecting depressions can be provided for crimping to lateral walls of the busbars opposite one another. Since both longitudinal sides in the area of the connecting depressions are plastically deformed into them, a good electrically conducting and mechanically firm connection is produced, which, moreover, can be brought about quickly.

Preferably, the connecting depressions can be open upward and/or formed in the shape of a U. Furthermore, between adjacent connecting depressions, connecting bars can be advantageously formed.

In order to avoid inserting the connecting element too far into the busbars and to be able to simply and quickly align pressing bars, situated in a crimping tool for the crimping, with the connecting depressions, the main part can have at least one longitudinal stop that protrudes transverse to the longitudinal direction of the main part.

Advantageously, the main part can have at least one centering bar running in a longitudinal direction, which lies in a longitudinal centering opening of the busbars. The centering bar can advantageously be used as a pressing surface for the centering edges of the busbars, which are pressed during the crimping on the centering bar and then are pressed together with the lateral walls of the busbars.

V-shaped longitudinal grooves can thereby run in a parallel and lateral manner relative to the centering bar. Furthermore, the connecting depressions can advantageously completely interrupt the outer edges of the V-shaped longitudinal grooves toward the top. Preferably, the outer edges of the V-shaped longitudinal grooves can still stand in the area of connecting bars formed between adjacent connecting depressions.

An initially mentioned assembly kit is characterized in accordance with the invention by a connecting element in accordance with the invention which is described above and below. Advantageously, the assembly kit can comprise a crimping tool for the production of an electrically conducting crimping connection between the first conductor strand and the connecting element and the second conductor strand and the connecting element, wherein the crimping tool advantageously has an inspection opening for the visual centering of the crimping tool opposite the connecting site of the conductor strands. This makes possible a simple and quick assembly of the contact line in situ.

An initially mentioned contact line in accordance with the invention is characterized by a connecting element in accordance with the invention which is described above and below. The contact line can advantageously provide an insulating cover to cover a connecting site of two conductor strands that are connected with one another, so as to avoid risks to the personnel during the operation of the contact line.

A method for the connecting of two busbars of a contact line by means of a connecting element in accordance with the invention described above and below is characterized in accordance with the invention by the following steps: a) plugging the connecting element into the individual longitudinal cavities of the two busbars which are to be connected; b) alignment of the pressing bars of a crimping tool with the corresponding connecting depressions of the connecting element; and c) pressing in, and thereby the plastic deformation of, the lateral walls of the busbars into the connecting depressions by means of the pressing bars of the crimping tool. Preferably, in step b), the pressing bars can be thereby aligned with the connecting site between the two busbars via an inspection opening of the crimping tool.

BRIEF DESCRIPTION OF THE DRAWINGS

Other features and advantages of the invention can be deduced from the following description of a preferred embodiment example, with the aid of the drawings. The figures show the following.

DETAILED DESCRIPTION OF THE INVENTION

Figure 1:
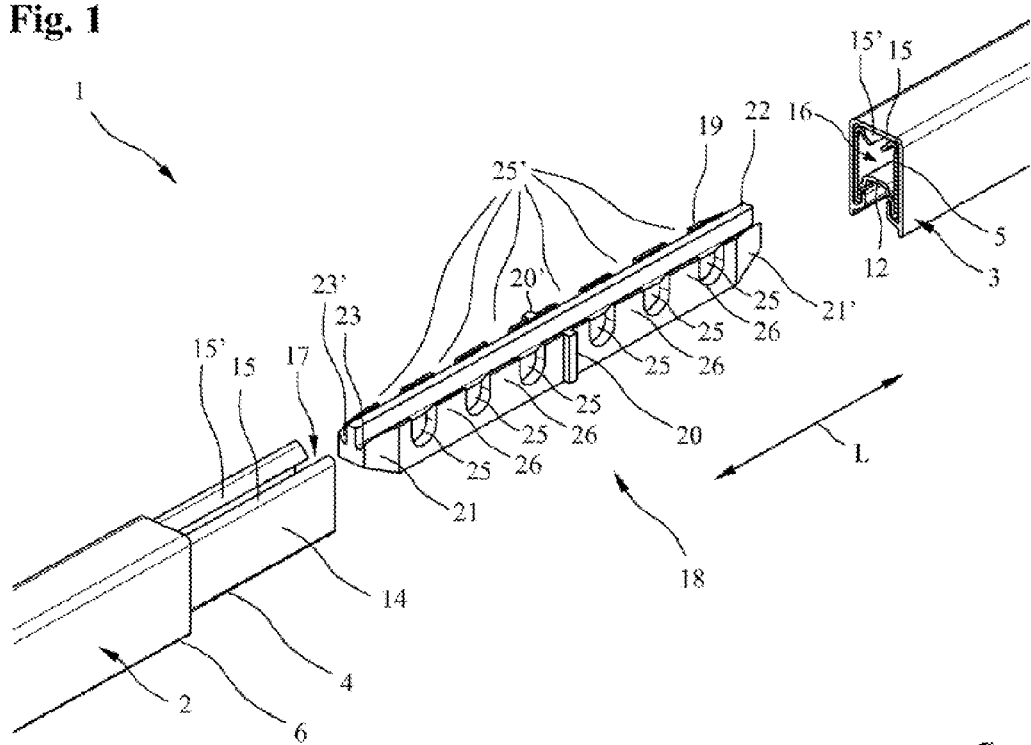
FIG. 1, a schematic three-dimensional inclined view of a connecting element in accordance with the invention and two conductor strands of a contact line before the connection.

FIG. 1 shows a section of a contact line 1. Since the contact line 1 is very long, it is, as a rule, composed of a large number of successive conductor strands, which may have only a specific maximum length because of transport reasons. By way of example, FIG. 1 shows such a site, on which a first conductor strand 2 is to be connected with a second conductor strand 3.

In a manner which is, in fact, known, the conductor strands 2, 3 respectively consist of a first busbar 4 and a second busbar 5, which are respectively surrounding by a first insulating profile 6 and a second insulating profile 7 made of plastic, which are made of an electrically insulating plastic material. The busbars 4, 5 are preferably made of a relatively soft material with good electrical conductivity, such as aluminum or copper. Basically, however, harder materials, such as steel, can also be used.

In a manner which is, in fact, known, the contact line 1 is used to provide electrical energy to an electrical consumer which can be displaced on it, in its longitudinal direction L, or is arranged so it can move freely. To this end, the consumer has a current collector with a contact strip S, which is merely alluded to in FIGS. 6 and 7, which slides along into the busbars 4, 5 and produces the electrical connection between the consumer and the contact line 1. Also, several contact lines 1 are often arranged parallel to one another, so that a corresponding number of contact strips S is used. The consumer with the current collector is sufficiently known, so that a graphic representation has been dispensed with.

Figure 2:
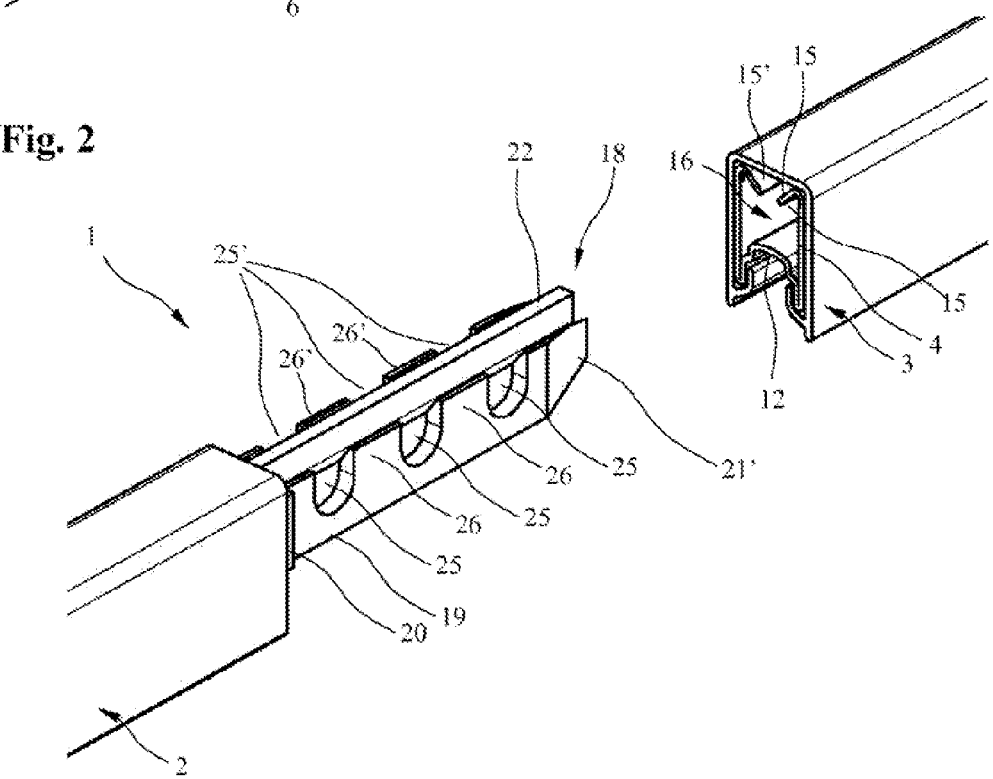
FIG. 2, a partially connected contact line in accordance with FIG. 1, in an enlarged representation.
Figure 3:
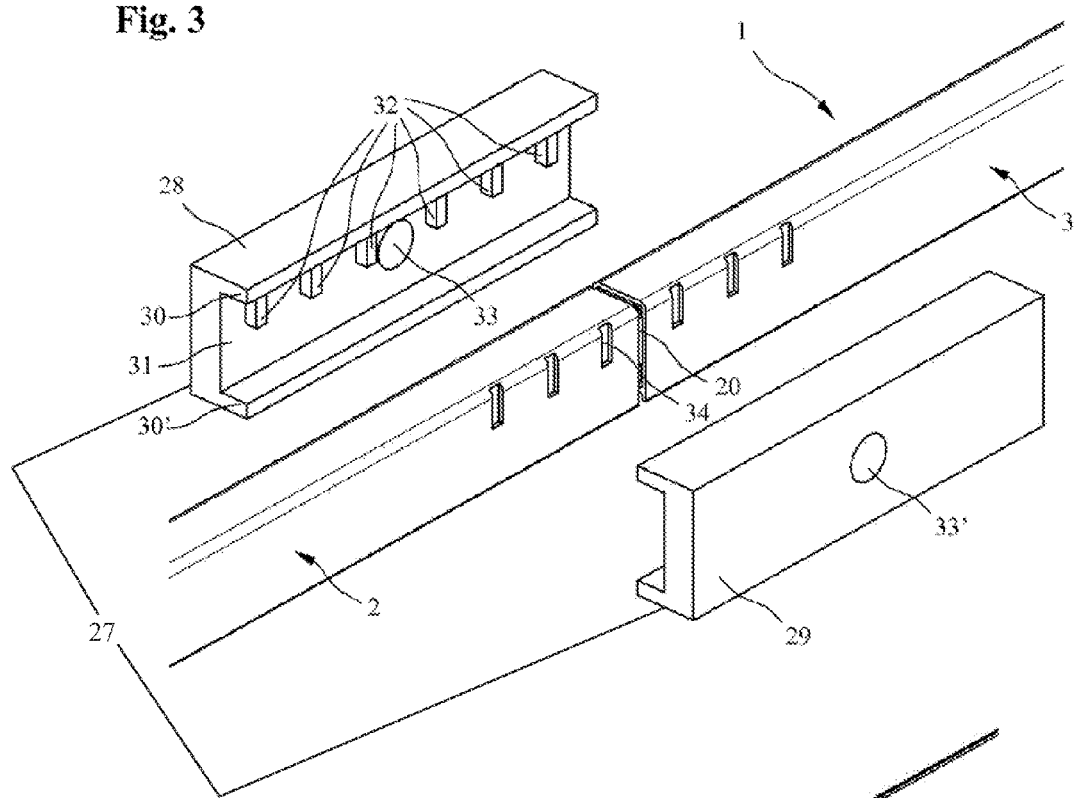
FIG. 3, a completely connected contact line in accordance with FIG. 1, with connecting tools for the setting up of the connection of the two conductor strands.
Figure 4:
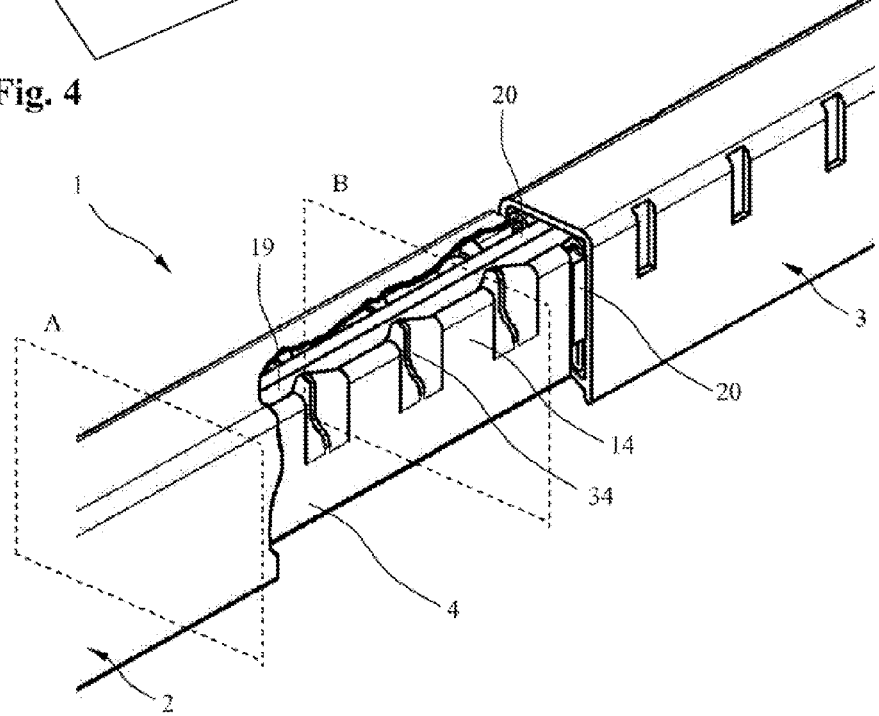
FIG. 4, a partially cutaway view of the completely connected contact line from FIG. 3.
Figure 5:
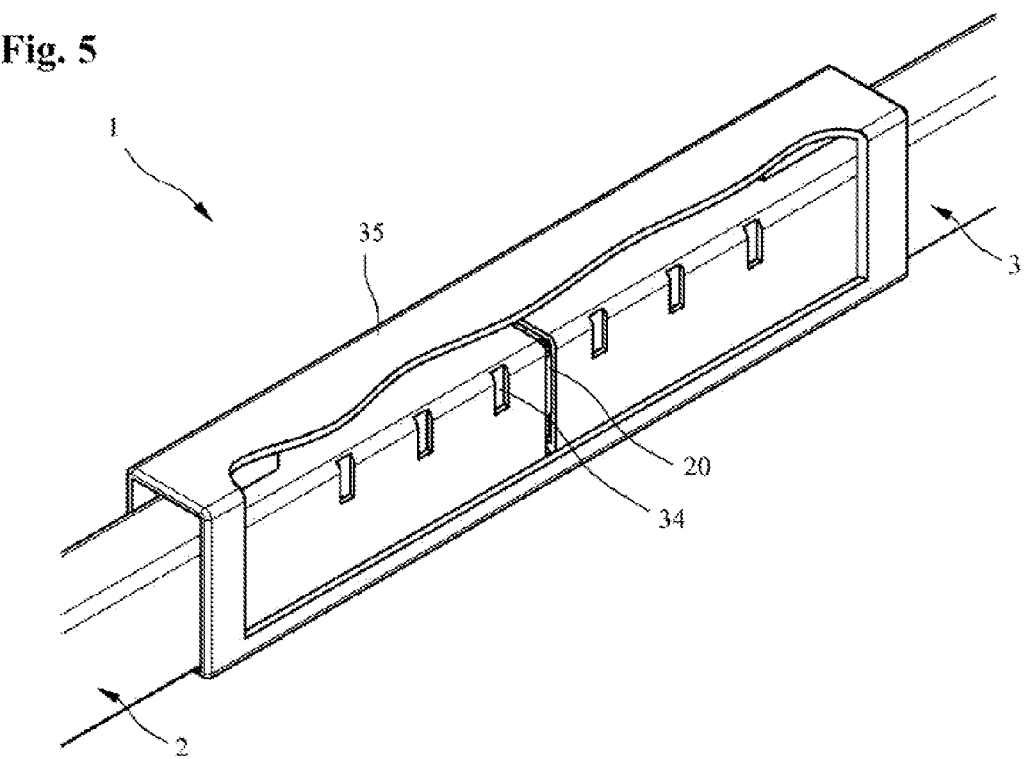
FIG. 5, the connected contact line from FIG. 4 with a protective cover in a partially cutaway view.

The structure of the conductor strands 2, 3 is described with the aid of the cross section through the left conductor strand 2, in FIGS. 1 to 5, along the plane A in FIG. 4. Since the conductor strands 2, 3 are designed identical to the busbars 4, 5 and the insulating profiles 6, 7, the corresponding statements are also valid for the right conductor strand 3 in FIGS. 1 to 5.

Figure 6:
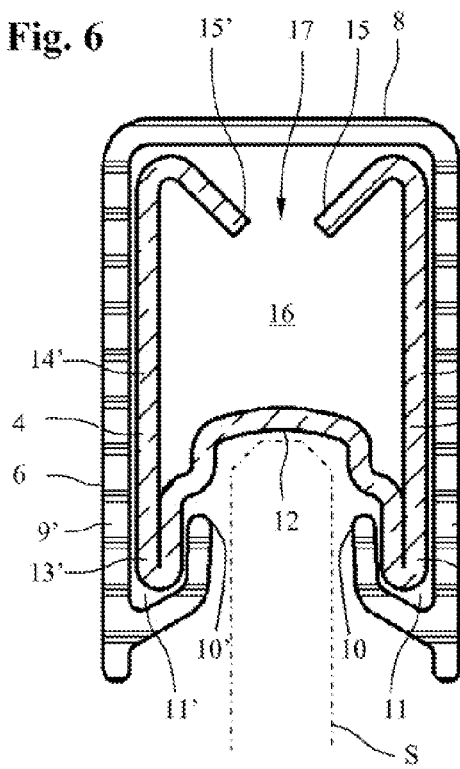
FIG. 6, a cross section through the contact line from FIG. 4, along plane A.

FIG. 6 shows that the first insulating profile 6 has an essentially U-shaped cross section with a middle section 8, from which insulating walls 9, 9' run essentially perpendicularly. On their free ends, the insulating walls 9, 9' have retaining lugs 10, 10', which point backward to the middle section 8, so that retaining grooves 11, 11' are formed between the insulating walls 9, 9' and the retaining lugs 10, 10' for the detachable holding of the first busbar 4.

As can be seen clearly in FIG. 6, the first busbar 4 is produced from an elongated sheet metal strand and has an essentially H-shaped cross section. The crossbeam of the H-shaped cross section thereby forms a trough-shaped contact section 12 for the contact strip S of the current collector of the electrical consumer, which can be displaced along the contact line 1.

From the contact section 12, the sheet metal strand first runs perpendicularly in the direction of the contact strip S. By bending the sheet metal strand by 180°, retaining bars 13, 13 with double the sheet metal thickness are formed which are then converted into lateral walls 14, 14' that run in the direction of the contact section 12 and beyond. On one side of the contact section 12, opposite the retaining bars 13, 13', the lateral walls 14, 14' are bent downward and toward the contact section 12 for the formation of centering edges 15, 15'. The contact section 12, the lateral walls 14, 14', and the centering edges 15, 15' form a longitudinal cavity 16 with a centering opening 17 between the centering edges 15, 15'.

In order to connect the first insulating profile 6 with the first busbar 4, the first busbar 4 is inserted into the first insulating profile 6 on the front side. The retaining lugs 10, 10' thereby embrace the retaining bars 13, 13' so that the first busbar 4 cannot fall downward from the first insulating profile 6. As indicated in FIG. 1, the first insulating profile 6 can then be displaced in the longitudinal direction L, opposite the first busbar 4, without dropping down from it. Moreover, the retaining lugs 10, 10' are a contact protection for the first busbar 4, which carries current and voltage when in operation, and, in particular, for the retaining bars 13, 13'. The opening between the retaining lugs 10, 10' is thereby just wide enough that the contact strip S can be in sliding contact with the contact section 12, and, on the other hand, is narrow enough so that the busbar 4 cannot not be touched with a finger.

Figure 7:
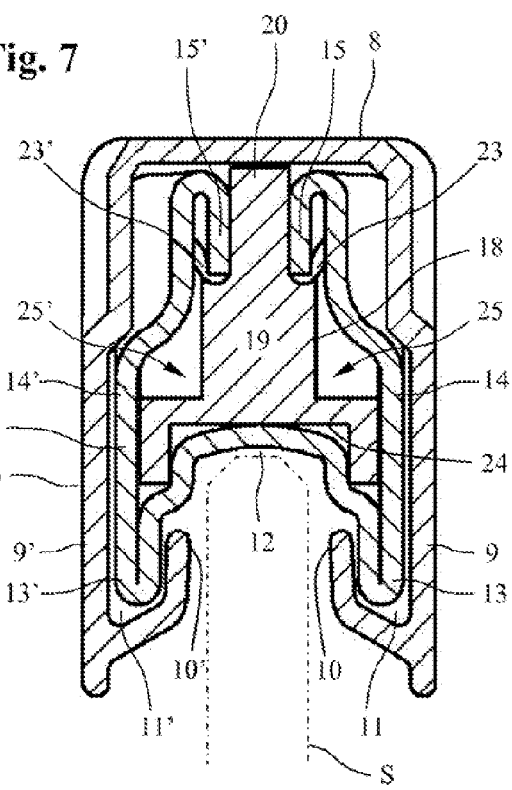
FIG. 7, a cross section through the contact line from FIG. 4, along a connecting site that runs through plane B.

In order to connect the two conductor strands 2 and 3 to each other in an electrically conducting and mechanical manner, a connecting element 18 in accordance with the invention is provided, which can be seen particularly clearly in FIGS. 1, 2, and 7. The connecting element 18 has an elongated main part 19 with an outer contour that is extensively adapted to the longitudinal cavity 16 and the centering opening 17 of the busbar 4, 5. The connecting element 18 is preferably made of the same material as the busbars, so as to avoid corrosion due to the different materials. If different materials are used, a harder material than that of the busbars 4, 5 is selected for the connecting element 18.

In order to prevent the connecting element 18 from being inserted too far into the busbars 4, 5 during the assembly in situ, it has, in its longitudinal middle, transverse to the longitudinal direction L, longitudinal stops 20, 20' that protrude laterally outward. The longitudinal stops 20, 20' then bump into the busbars 4, 5 on their individual front sides during the insertion of the connecting element 18. Preferably, the longitudinal stops 20, 20' protrude laterally so far beyond the main part 19 that the front sides of the insulating profiles 6, 7 also bump into them. Thus, the bumping site between the two conductor strands 2, 3 can be easily detected during the assembly process.

In order to be able to insert the connecting element 18 more simply in the longitudinal direction L into the longitudinal cavities 16 of the busbars 4, 5, opposing insertion ends 21, 21' taper at their ends; in the embodiment example under consideration, this occurs in that the underside of the main part 19 is inclined upward and the longitudinal sides of the main part 19 is inclined inward toward the central longitudinal axle of the main part 19.

In order to further simplify the insertion of the connecting element 18 into the busbars, a centering bar 22 is provided, which runs continuously in the longitudinal direction of the main part 19 and which is situated above in the drawings. The centering bar 22 is somewhat narrower than the centering opening 17, so that it can be inserted unimpeded, as can be clearly seen in FIG. 7. Moreover, approximately V-shaped longitudinal grooves 23, 23', which are open upward, are provided at the lower end of the centering bar 22; they are adapted to the V-shaped centering edges 15, 15' of the busbars 4, 5, which are bent inward at an incline. This ensures a centered insertion of the connecting element 18 into the busbars 4, 5.

On its underside, opposite the centering bar 22, the main part 19 has a wide middle groove 24, which can be seen in FIG. 7, in which the trough-shaped contact section 12 of the busbar 4 lies. Here too, the best possible and centered seat of the connecting element 18 in the busbars 4, 5 is ensured.

Basically, in the area of the trough-shaped contact section 12 between the busbars 4, 5, a gap is formed that corresponds to the width of the longitudinal stops 20, 20' and on which the contact strip S can be tilted or abraded. In order to avoid this, the main part 19, on its underside at the site of the longitudinal stops 20, 20', can advantageously have a protruding compensation bar, which cannot be seen in the drawings and which is as high as or slightly lower than the sheet metal thickness of the busbars 4, 5 in the area of the trough-shaped contact section 12.

In order to make possible a safe electrically conducting and mechanically firm connection of the two busbars 4, 5 and thus of the first and second conductor strands 2, 3, several U-shaped connecting depressions 25, 25', which are open upward, are introduced into the longitudinal sides of the main part 19, opposite one another, between which connecting bars 26, 26' are formed. For reasons having to do with a simpler description, all connecting depressions lying on one longitudinal side are designated with the same reference numbers 25 and 25'. The same applies to the connecting bars 26 and 26'. The connecting depressions 25, 25' are designed identical here and are distributed over the longitudinal sides of the main part 19, to the right and to the left of the longitudinal stops 20, 20', at the same distance from one another. The U-shaped connecting depressions 25, 25', which are open upward, completely interrupt the outer edges of the V-shaped longitudinal grooves 23, 23' toward the top, as can be seen in FIG. 7. Since in the area of the connecting bars 26, 26', the outer edges of the V-shaped longitudinal groves 23, 23' are still there, these areas offer a sufficient guide for the centering edges 15, 15', turned inward at an incline, during the insertion of the connecting element 18 into the busbars 4, 5.

After plugging in the connecting element 18 into the two conductor strands 2, 3, and for the purpose of connecting them with one another in a mechanically firm and electrically conducting manner, the lateral walls 14, 14' of the busbars 4, 5 are definitely consigned to the U-shaped connecting depressions 25, 25' by means of a crimping tool 27, shown in FIG. 3. To this end, the crimping tool 27 has two identically designed tool halves 28, 29, so that only one tool half 28 is described below. Transverse to the longitudinal direction, the tool half 28 has an essentially U-shaped cross section, so that holding bars 30, 30' are formed. A corresponding number of pressing bars 32 are provided, in accordance with the positions of the connecting depressions 25' on the main part 19, on a crimping surface 31 of the tool half 28 between the holding bars 30, 30'.

The inner distance between the holding bars 30, 30' is somewhat larger than the height of the insulating profiles 6, 7, so that the holding bars 30, 30' embrace the conductor strands 2, 3 laterally and ensure a positioning of the tool halves 28, 29 and thus of the pressing bars 32 opposite the connecting depressions 25 in the height direction of the conductor strands 2, 3.

Furthermore, a continuous inspection opening 33 (on tool half 28), 33' (on tool half 29) is provided in the longitudinal middle of the tool halves 28, 29, so as to be able to position the tool halves 28, 29 opposite the longitudinal stops 20, 20'. In this way, an exact positioning of the pressing bars 32 opposite the connecting depressions 25, in the longitudinal direction L, is attained.

To bring about the crimping connection in accordance with FIGS. 3 and 4, the two tool halves 28, 29 are then aligned on the longitudinal stops 20, 20' via the inspection openings 33, 33', wherein the pressing bars 32 are aligned on the connecting depressions 25, 25', covered by the first and second insulating profiles 20, 20' Subsequently, the tool halves 28, 29, aligned relative to one another, are pressed on one another, wherein the pressing bars 32 press both the insulating walls 9, 9' of the first and second insulating profiles 6, 7 and also the lateral walls 14, 14' of the busbars 4, 5 into the connecting depressions 25, 25'. The pressing bars 32 are therefore somewhat narrower and shorter than the connecting depressions 25', so as to prevent the punching out of the lateral walls 14, 14' during the crimping of the busbars 4, 5 with the connecting element 18.

As can be seen particularly well in FIG. 4 and with the aid of the section through the crimping site 34, along plane B in FIG. 7, the centering edges 15, 15' in the area of the connecting depressions 25, 25' are moved in this way against the centering bar 22 and pressed so strongly that they are plastically deformed there and thus are permanently present on the centering bar 22. In this way, an additional safe transfer of the current between the busbars 4, 5 is ensured via the connecting element 18. Since the lateral walls 14, 14' of the busbars are permanently and firmly inserted into the connecting depressions 25, 25' in a plastically deformed manner, a safe and permanently firm mechanical connection between the connecting element 18 and the busbars 4, 5 is also attained for the good electrically conducting connection. In this way, a quick and nevertheless safe connection with good conductivity is also produced, wherein, in particular, no additional securing elements, such as screw connections, pins, or the like, have to be provided.

Since the busbars 4, 5 are preferably made of a relatively soft material with good electrical conductivity, such as aluminum or copper, the crimping connection described above can be produced simply and with a low assembly effort. Basically, however, harder materials, such as steel, can also be used, if the material thickness will still permit a crimping of the lateral walls.

Since the insulating walls 9, 9' are also pressed in and are permanently plastically deformed by the pressing bars 32, the insulating profiles 6, 7 are also defined in the longitudinal direction.

In order to prevent a contacting of the longitudinal stops 20, 20', which are not covered by the insulating profiles 6, 7, a U-shaped plastic cover 35 is still clipped on over the bumping site of the two crimped conductor strands 2,3 after the crimping, which leaves open the intervention opening for the contact strip S of the current collector.

LIST OF REFERENCE SYMBOLS

1 Contact line
2 First conductor strand
3 Second conductor strand
4 First busbar
5 Second busbar
6 First insulating profile
7 Second insulating profile
8 Middle section
9, 9' Insulating walls
10, 10' Retaining lugs
11, 11' Retaining grooves
12 Trough-shaped contact section
13, 13' Retaining bars
14, 14' Lateral walls
15, 15' Centering edges
16 Longitudinal cavity
17 Centering opening
18 Connecting element
19 Main part
20, 20' Longitudinal stops
21, 21' Insertion ends
22 Centering bar
23, 23' V-shaped longitudinal grooves
24 Middle groove
25, 25' U-shaped connecting depressions
26 Connecting bars
27 Crimping tool
28 First tool half
29 Second tool half
30, 30' Holding bars
31 Crimping surface
32 Pressing bars
33, 33' Inspection openings
34 Crimping site
35 Insulating cover

The invention claimed is:

1. A connecting element for connection of two busbars of a contact line, each of the two busbars having a longitudinal cavity and first and second lateral walls, the connecting element comprising:
   an elongated main part with insertion ends, opposite one another in a longitudinal direction of the main part, the insertion ends insertable into longitudinal cavities of each busbar; and first and second longitudinal sides extending from one insertion end to the other insertion end,
   wherein the main part has on at least one of the first and second longitudinal sides connecting depressions configured and dimensioned for crimping to at least one of the first and second lateral walls of each busbar to thereby electrically and mechanically connect the two busbars.

2. The connecting element of claim 1, wherein the connecting depressions are provided on both the first and second longitudinal sides of the main part.

3. The connecting element of claim 1, wherein the connecting depressions are open toward one side of the main part.

4. The connecting element of claim 3, wherein the connecting depressions are open upward.

5. The connecting element of claim 3, wherein the connecting depressions are U-shaped.

6. The connecting element of claim 1, wherein connecting bars are formed between adjacent connecting depressions.

7. The connecting element of claim 1, wherein the main part has at least one longitudinal stop protruding transverse to the longitudinal direction of the main part.

8. The connecting element of claim 1, wherein the main part has at least one centering bar running in ifs the longitudinal direction of the main part.

9. The connecting element of claim 8, wherein a V-shaped longitudinal groove runs parallel and lateral to the centering bar of the first longitudinal side of the main part.

10. The connecting element of claim 9, wherein the connecting depressions completely interrupt outer contours of the V-shaped longitudinal groove toward a top of the main part.

11. The connecting element of claim 10, wherein connecting bars are formed between adjacent connecting depressions and wherein outer edges of the V-shaped longitudinal groove are present near the connecting bars.

12. The connecting element of claim 1, wherein the main part has a middle groove, running in the longitudinal direction of the main part, to hold a trough-shaped contact section of each busbar.

13. The connecting element of claim 12, wherein the middle groove is interrupted by a compensation bar, running transverse to the longitudinal direction of the main part.

14. The connecting element of claim 1, wherein the connecting element is produced from an electrically conductive material, in particular, aluminum or copper.

15. The connecting element of claim 1, wherein the connecting element is produced from the same material as or from a harder material than the two busbars.

16. An assembly kit for a contact line with a first conductor strand, a second conductor strand, and the connecting element of claim 1, the connecting element electrically conducting and mechanically connecting the first conductor strand with the second conductor strand.

17. The assembly kit for a contact line of claim 16, wherein the assembly kit comprises a crimping tool for establishment of an electrically conducting crimping connection between the first conductor strand and the connecting element and the second conductor strand and the connecting element.

18. The assembly kit for a contact line of claim 17, wherein the crimping tool has an inspection opening for the visual centering of the crimping tool opposite a connecting site of the first and second conductor strands.

19. The assembly kit for a contact line of claim 17, wherein the crimping tool has pressing bars, located on a crimping surface, corresponding to the connecting depressions in the connecting element, for plastic deformation, in particular, crimping, of the two busbars.

20. The assembly kit for a contact line of claim 17, wherein the crimping tool has two tool halves comprising holding bars, running in a longitudinal direction of the first and second conductor strands, for partial embracing of the first and second conductor strands which are to be connected.

21. A contact line with a first conductor strand and a second conductor strand, the first and second conductor strands connected with the connecting element of claim 1 in a conducting and mechanical manner.

22. The contact line of claim 21, wherein each of the two busbars is produced from an electrically conductive material.

23. The contact line of claim 22, wherein the longitudinal cavity of each of the two busbars has a centering opening, running in a longitudinal direction of the busbar toward one longitudinal side of the busbar, for the holding of a centering bar of the connecting element.

24. The contact line of claim 23, wherein the centering opening of each of the two busbars runs between centering edges of the busbar, wherein the centering edges run inwards, at an incline, and toward the longitudinal cavity of the busbar and are at a distance from one another.

25. The contact line of claim 21, wherein an insulating cover is provided to cover a connecting site of the first and second conductor strands that are connected with one another.

26. A method for connection of two busbars of a contact line with the connecting element of claim 1, the method comprising:
 a) plugging in of the connecting element into individual longitudinal cavities of the two busbars that are to be connected;
 b) alignment of pressing bars of a crimping tool with corresponding connecting depressions of the connecting element; and
 c) pressing in and thereby plastic deformation of lateral walls of the busbars into the connecting depressions with the pressing bars.

27. The method of claim 26, wherein the pressing bars in step b) are aligned with a connecting site between the two busbars via at least one inspection opening of the crimping tool.

* * * * *